United States Patent
Maruhashi et al.

(10) Patent No.: US 10,597,619 B2
(45) Date of Patent: Mar. 24, 2020

(54) FERMENTED MALT BEVERAGE

(71) Applicant: Suntory Holdings Limited, Osaka-shi, Osaka (JP)

(72) Inventors: Taichi Maruhashi, Osaka (JP); Kaneo Oka, Fuchu (JP); Yoshinori Hida, Osaka (JP)

(73) Assignee: SUNTORY HOLDINGS LIMITED, Osaka-shi (JP)

( * ) Notice: Subject to any disclaimer, the term of this patent is extended or adjusted under 35 U.S.C. 154(b) by 0 days.

(21) Appl. No.: 14/786,636

(22) PCT Filed: Mar. 27, 2014

(86) PCT No.: PCT/JP2014/058863
§ 371 (c)(1),
(2) Date: Oct. 23, 2015

(87) PCT Pub. No.: WO2014/174978
PCT Pub. Date: Oct. 30, 2014

(65) Prior Publication Data
US 2016/0075980 A1 Mar. 17, 2016

(30) Foreign Application Priority Data
Apr. 25, 2013 (JP) ................. 2013-092383

(51) Int. Cl.
| C12C 12/00 | (2006.01) |
| C12C 7/04 | (2006.01) |
| C12C 11/00 | (2006.01) |
| C12C 7/20 | (2006.01) |
| C12C 11/02 | (2006.01) |

(52) U.S. Cl.
CPC ............ *C12C 12/00* (2013.01); *C12C 7/04* (2013.01); *C12C 7/205* (2013.01); *C12C 11/003* (2013.01); *C12C 11/02* (2013.01)

(58) Field of Classification Search
CPC .................... C12C 12/00; C12C 7/205
See application file for complete search history.

(56) References Cited

U.S. PATENT DOCUMENTS

| 4,430,348 A * | 2/1984 | Duncombe ............ C12C 5/004 426/13 |
| 5,618,572 A | 4/1997 | Tripp et al. |
| 5,879,557 A | 3/1999 | Strohm et al. |
| 6,372,269 B1 * | 4/2002 | Rangel-Aldao ........... C12C 5/02 426/62 |
| 2008/0220121 A1 | 9/2008 | Dorr et al. |
| 2013/0108735 A1 | 5/2013 | Vanderhaegen |

FOREIGN PATENT DOCUMENTS

| CN | 1034955 A | 8/1989 |
| EP | 1544285 A1 | 6/2005 |
| FR | 2824566 A1 | 11/2002 |
| JP | 09-503659 A | 4/1997 |
| JP | 2011-139671 A | 7/2011 |
| JP | 11-056336 A | 11/2011 |
| WO | 2011/138128 A1 | 10/2011 |

OTHER PUBLICATIONS

Asakura et al. (JP 2010207243) 1 page.*
Math.com https://web.archive.org/web/20010105210100/http://www.math.com/school/subject1/lessons/S1U2L1DP.html 2 pages Jan. 5, 2001 (Year: 2001).*
Otterm, G. E. et al, "Determination of the Sugar Composition of Wort and Beer by Gas Liquid Chromatography", 1967, vol. 73, pp. 570-576.
Brewer's Friend, Beer, Styles-IBU Chart Graph (Bitterness Range), http://www.brewersfriend.com/2009/01/24/beer-styles-ibu-chart-graph-bitterness-range/(2009.01.24).
Office Action dated Feb. 28, 2017, issued in counterpart Korean Application No. 10-2015-7033466, with English translation. (11 pages).
Extended (supplementary) European Search Repord dated Nov. 2, 2016, issued in counterpart European Application No. 14788965.3. (9 pages).
International Search Report dated Jun. 17, 2014 issued in counterpart International patent application No. PCT/JP2014/058863. (2 pages).
Hideo Miyachi, et al., Shokuhin Sangyo Shimbunisha Co., Ltd., 1999, pp. 278-282, 351, 352, 473, 476-478, No English Trans.

* cited by examiner

*Primary Examiner* — Felicia C Turner
(74) *Attorney, Agent, or Firm* — Westerman, Hattori, Daniels & Adrian, LLP

(57) ABSTRACT

A fermented malt beverage obtained by fermenting a malt with an yeast, characterized in that the fermented malt beverage fulfills: (A) a bitterness unit measured in accordance with a method described in the section 8.15 Bitterness Units of The Methods of Analysis of BCOJ: 30 to 45 BU; and (B) a total content of sugars composed of glucose, sucrose, maltose, isomaltose, and a trisaccharide: 0.9 to 3.0 w/v %. The fermented malt beverage of the present invention is provided with bitterness and sweetness, and excellent in the balances thereof, so that the beverage can provide a new taste as a luxury product.

10 Claims, No Drawings

FERMENTED MALT BEVERAGE

TECHNICAL FIELD

The present invention relates to a fermented malt beverage such as beer.

BACKGROUND ART

As pilsner-type beers, beers having bitterness values exceeding 30 BU have been marketed outside Japan, but beers of from 20 BU to less than 30 BU are mostly found in Japan. In addition, in the beer markets in Japan of the recent years, bitter taste is likely to be avoided, and studies have been made on fermented malt beverages having various tastes while reducing bitterness.

For example, Patent Publication 1 reports a method including bringing a hop into contact with wort at a relatively low temperature, and gradually raising the temperature to boil, thereby controlling the quality of the bitterness ingredient of the hop added to give mildness and body of a post-aged hop-like hop. The patent publication describes that the beer obtained by the above method preferably has a bitterness unit B.U. of from 24 to 28.

RELATED ART REFERENCES

Patent Publications

Patent Publication 1: Japanese Patent Laid-Open No. 2011-139671

SUMMARY OF THE INVENTION

Problems to be Solved by the Invention

In general, when a bitterness unit exceeds 30 BU, although the richness in taste is given, bitterness is undesirably outstanding, thereby making it a fermented malt beverage lacking a balance therebetween. In view of the above, bitterness is adjusted by usually controlling the amount of hops so that the bitterness would not be outstanding, but the richness in taste derived from bitterness would be undesirably reduced thereby. In addition, in the recent years, diversification of the likings has been progressed, so that fermented malt beverages having new tastes are in demand.

An object of the present invention is to provide a new well-balanced fermented malt beverage while having a bitterness unit of 30 BU or more and being rich in taste derived from the bitterness.

Means to Solve the Problems

In view of the above, as a result of the intensive studies in order to solve the problems, the present inventors have found that when beers having a bitterness unit of 30 BU or more are brewed so that contents of particular sugars would be in specified ratio, beers rich in taste, having a good balance between bitterness and sweetness can be produced. The present invention has been perfected thereby.

Specifically, the present invention relates to the following [1] and [2]:

[1] a fermented malt beverage obtained by fermenting a malt with an yeast, characterized in that the fermented malt beverage fulfills the following (A) and (B):

(A) a bitterness unit measured in accordance with a method described in the section 8.15 Bitterness Units of The Methods of Analysis of BCOJ: 30 to 45 BU; and (B) a total content of sugars composed of glucose, sucrose, maltose, isomaltose, and a trisaccharide: 0.9 to 3.0 w/v %; and

[2] a fermented malt beverage obtained by fermenting a malt with an yeast, characterized in that the fermented malt beverage fulfills the following (A) and (C):

(A) a bitterness unit measured in accordance with a method described in the section 8.15 Bitterness Units of The Methods of Analysis of BCOJ: 30 to 45 BU; and (C) a content of a trisaccharide: 0.65 to 1.50 w/v %.

Effects of the Invention

The fermented malt beverage of the present invention has bitterness and sweetness, that is well balanced, that gives excellent richness in taste. In addition, the fermented malt beverage of the present invention exhibits some excellent effects that the temperature range in which the balance between bitterness and sweetness is maintained is wide, and the time when richness in taste is felt is extended even while the temperature of the beverage is changed during drinking.

Modes for Carrying Out the Invention

The fermented malt beverage of the present invention is obtained by fermenting a malt with an yeast, and one embodiment (Embodiment 1) fulfills the following (A) and (B):

(A) a bitterness unit measured in accordance with a method described in the section 8.15 Bitterness Units of The Methods of Analysis of BCOJ: 30 to 45 BU; and (B) a total content of sugars composed of glucose, sucrose, maltose, isomaltose, and a trisaccharide: 0.9 to 3.0 w/v %. In addition, another embodiment (Embodiment 2) fulfills the following (A) and (C):

(A) a bitterness unit measured in accordance with a method described in the section 8.15 Bitterness Units of The Methods of Analysis of BCOJ: 30 to 45 BU; and (C) a content of a trisaccharide: 0.65 to 1.50 w/v %.

In the present invention, the term "fermented malt beverage" means a beverage in which at least malts are used as raw materials, and the malts are fermented by an yeast. The fermented malt beverage includes, for example, beers which are beverages fermented by Brewers' yeasts, Happoushu (low-malt beers), and liqueurs. In the present invention, beers and Happoushu are preferred, and beers are more preferred.

The term mugi as used herein may be those generally used in the production of beers or Happoushu. The mugi includes, for example, barley, wheat, rye, karasumugi (white oats), oats, hatomugi (Job's heart), enbaku (oats), and the like, and barley is preferably used. These mugi may be used alone or in a combination of two or more kinds. The above mugi may be either germinated mugi or ungerminated mugi, and in the present invention, the germinated mugi is preferred. Among the germinated mugi, at least malt is used. The malt as used herein refers to a product obtained by drying germinated mugi and removing the roots. Here, those mugi that are roasted according to a known technique, for example, colored malt, may be used, from the viewpoint of adjusting the tones of the fermented malt beverage.

The fermented malt beverage of the present invention is produced by adding an yeast to a wort obtained from the raw materials containing the above malt to allow fermentation, and removing the yeast optionally with a filtering device.

The wort can be obtained by supplying raw materials added with a bitter flavor, a dye, or the like to the above mugi materials including the above malt to a mashing kettle or tun, optionally adding an enzyme such as amylase to allow gelatinization or saccharification, thereafter removing husk or the like by filtration, adding hops and the like and boiling, removing solid contents such as coagulated protein in a clarification tank. As the raw materials, other grains, starches, and sugars and the like can also be used. Next, the beverage is produced by adding an yeast to the wort obtained above to allow fermentation, and removing the yeast optionally with an filtering device. Here, the wort can go through the steps of storage (lagered liquor), filtration, bottling, and optionally sterilization. The conditions for these mashing step, boiling step, solid content-removing step, fermentation step, and the like may be those conditions that are generally known.

In the present invention, wort having various concentrations can be used, from the viewpoint of adjusting the sugar contents of glucose, sucrose, maltose, isomaltose, and the trisaccharide. For example, the wort having a concentration of preferably 11.5 w/w % or more, more preferably 12.0 w/w % or more, and even more preferably 12.3 w/w % or more, and preferably 13.5 w/w % or less, more preferably 13.0 w/w % or less, and even more preferably 12.7 w/w % or less can be used. In addition, the wort having a concentration of preferably from 11.5 to 13.5 w/w %, more preferably from 12.0 to 13.0 w/w %, and even more preferably from 12.3 to 12.7 w/w % can be used.

Also, as the yeast in the present invention, a known one can be used without particular limitations. In the present invention, an yeast that assimilates mainly glucose, sucrose, maltose, and isomaltose, but does not assimilate or hardly assimilate the trisaccharide can be selected and used in accordance with a known method, from the viewpoint of adjusting the concentration of the trisaccharide. By using the yeast, the progress of the fermentation may be adjusted so that a total content of the above sugars (glucose, sucrose, maltose, isomaltose, and the trisaccharide) in the fermented solution would be from 0.9 to 3.0 w/v %. Here, the yeast may be used alone or in a combination of two or more kinds.

The hops in the present invention are not particularly limited in the areas of produce and varieties, and known aroma hops, bitter hops, and the like may be used. Specific examples of the aroma hops include Hallertauer Mittelfrueh, Hallertauer Tradition, Hersbrucker, Perle, Tettnanger, Cascade, Saaz, Sladek and the like, and specific examples of the bitter hops include Northern Brewer, Herkules, Magnum, Nugget, Taurus, Galaxy, Target, and the like. These hops can be used alone or in a combination of two or more kinds.

In the present invention, the hops can be used by adjusting the timing of adding the hops into a boiling tank, from the viewpoint of adjusting the bitterness unit of the fermented malt beverage obtained. For example, if a large amount of hops are added at an early stage of boiling, α-acid is surely isomerized, so that the bitterness unit can be increased. Here, the adjustment of the timing of adding the hops refers to adjustment of the time for the hops to be present in the boiling tank, which can be carried out, for example, by adjusting a boiling time after the addition of hops.

Accordingly, the fermented malt beverage of the present invention can be allowed to have the bitterness unit and the sugar contents in specified ranges by adjusting the timing of supplying the hops to a boiling pot, and selecting and using an yeast that mainly assimilates glucose, sucrose, maltose, and isomaltose, but does not assimilate or hardly assimilate the trisaccharide.

The fermented malt beverage of the present invention thus obtained has a bitterness unit of 30 BU or more, preferably 31 BU or more, and more preferably 32 BU or more, and a bitterness unit of 45 BU or less, preferably 41 BU or less, and more preferably 40.5 BU or less. In addition, the fermented malt beverage has a bitterness unit of from 30 to 45 BU, preferably from 31 to 41 BU, and more preferably from 32 to 40.5 BU. The bitterness units of Embodiment 1 and Embodiment 2 are as mentioned above. The term "bitterness unit" in the present invention refers to a value measured in accordance with a method described in the section of "The Methods of Analysis of BCOJ (Nov. 1, 2004, revised edition), 8.15 Bitterness Units." Specifically, a bitterness unit (BU) is obtained by adding an acid to a degassed sample, thereafter extracting the mixture with isooctane, measuring absorbance of an isooctane layer obtained at 275 nm with isooctane as a reference, and multiplying with a factor.

The total content of the sugars composed of glucose, sucrose, maltose, isomaltose, and the trisaccharide in the fermented malt beverage of the present invention in Embodiment 1 is 0.9 w/v % or more, preferably 1.1 w/v % or more, more preferably 1.2 w/v % or more, even more preferably 1.3 w/v % or more, and still even more preferably 1.4 w/v % or more, and the total content is 3.0 w/v % or less, preferably 2.5 w/v % or less, and more preferably 1.9 w/v % or less. In addition, the total content is from 0.9 to 3.0 w/v %, preferably from 1.1 to 2.5 w/v %, more preferably from 1.2 to 2.5 w/v %, even more preferably from 1.3 to 2.5 w/v %, and still even more preferably from 1.4 to 1.9 w/v %. Also in Embodiment 2, a similar total content is preferred. Here, in the present invention, in the content of the above sugars, each sugar concentration is calculated with a column using an aminopropyl group as an immobilized phase, and acetonitrile as a mobile phase, separating each sugar with reverse phase mode and anion exchanging mode using an interaction between an —OH group of sugars and —$NH_2$ groups of the column, detecting the content with a differential refractometer detector, and multiplying by a previously determined factor. One of ordinary skill in the art can measure by referring to the details to "Carbohydrates in Brewing. I. Determination of Fermentable Sugars and Oligosaccharides in Wort and Beer by Partition High-Performance Liquid Chromatography," M. Uchida, K. Nakatani, M. Ono, and K. Nagami, Suntory Ltd., Osaka 618, Japan.

In addition, a total content of glucose, sucrose, maltose, and isomaltose (hereinafter simply referred to as the monosaccharides and the disaccharides) in the fermented malt beverage of the present invention is preferably 0.25 w/v % or more, more preferably 0.28 w/v % or more, and even more preferably 0.3 w/v % or more, and the total content is preferably 2.35 w/v % or less, more preferably 1.6 w/v % or less, and even more preferably 0.9 w/v % or less. In addition, the total content is preferably from 0.25 to 2.35 w/v %, more preferably from 0.28 to 1.6 w/v %, and even more preferably from 0.3 to 0.9 w/v %. In addition, a total content of the trisaccharide in the fermented malt beverage of the present invention in Embodiment 2 is 0.65 w/v % or more, preferably 0.70 w/v % or more, more preferably 0.75 w/v % or more, even more preferably 0.80 w/v % or more, and still even more preferably 0.85 w/v % or more, and the total content is 1.50 w/v % or less, and preferably 1.30 w/v % or less. In addition, the total content is from 0.65 to 1.50 w/v %, preferably from 0.70 to 1.50 w/v %, more preferably from 0.75 to 1.50 w/v %, even more preferably from 0.80 to 1.50 w/v %, and still even more preferably from 0.85 to 1.30 w/v %. Also in Embodiment 1, a similar total content of the trisaccharide is preferred.

The weight ratio of the trisaccharide to the monosaccharide and the disaccharide (trisaccharide/monosaccharide and disaccharide) is preferably from 0.25 to 3.5, more preferably from 1.0 to 3.0, even more preferably from 1.80 to 3.0, and still even more preferably from 1.80 to 2.7.

Here, the above trisaccharide includes maltotriose, isomaltotriose, and panose. In the present invention, maltotriose and isomaltotriose are preferred.

The fermented malt beverage of the present invention may fulfill the above conditions (A) and (B), or fulfill the above conditions (A) and (C), and the fermented malt beverage has a color of preferably 10 EBC or more, more preferably 12 EBC or more, and even more preferably 13.0 EBC or more, and preferably 20 EBC or less, more preferably 19 EBC or less, and even more preferably 18.5 EBC or less. In addition, the fermented malt beverage has a color of preferably from 10 to 20 EBC, more preferably from 12 to 19 EBC, and even more preferably from 13.0 to 18.5 EBC.

The color of the fermented malt beverage as used herein refers to a value measured in accordance with a method described in a section of "The Methods of Analysis of BCOJ (Nov. 1, 2004, revised edition), 8.8 Color." Specifically, the color is obtained by measuring the absorbance of a degassed sample with a monochromatic light at 430 nm, and multiplying with a factor.

In addition, the fermented malt beverage of the present invention has an alcohol content of preferably 3.8 w/w % or less, and more preferably 3.75 w/w % or less, and preferably 3.2 w/w % or more, and more preferably 3.3 w/w % or more. In addition, the fermented malt beverage has an alcohol content of preferably 3.8 w/w % or less, more preferably from 3.2 to 3.8 w/w %, and even more preferably from 3.3 to 3.75 w/w %. The alcohol content of the fermented malt beverage as used herein refers to a value measured by Alcolyzer manufactured by Anton-Paar in accordance with a method described in the section of "The Methods of Analysis of BCOJ (2008, revised edition), 8.3.6 Alcohol." Specifically, an alcohol concentration is measured by subjecting a degassed sample to a near-infrared spectrophotometer.

The fermented malt beverage of the present invention may be in a state in which the yeast after the fermentation step is removed or as is contained. In a case where the yeast is as is contained, it is preferable that the fermented malt beverage obtained is subjected to a chilled storage or storage in a cold dark place.

As the chilled storage, it is preferable that the beverage is allowed to cool under conditions that the yeast does not undergo fermentation in order to maintain taste and flavor. Here, the "conditions that the yeast does not undergo fermentation" refer to conditions in which the fermentation of the yeast does not take place at all, or if any, conditions that an increase in alcohol content by the fermentation of the yeast would be less than 0.1 w/w % in an ordinary storage period, for example, one month. Specifically, a temperature of from 0° to 10° C. is preferred, and a temperature of from 0° to 5° C. is more preferred. In addition, as to the storage period, the storage can be carried out for a period in which the fermentation by an yeast is inhibited. Specifically, it is possible to store for about 9 months or so. Here, the storage method is not particularly limited so long as the temperature is maintained under the above conditions, and a known method can be used.

EXAMPLES

The present invention will be specifically described hereinbelow by the Examples, without intending to limit the scope of the present invention to the following Examples.

Test Example 1

Examples 1 to 12 and Comparative Examples 1 to 3

Nine-hundred and fifty kilograms of malts were milled to an appropriate powder size, the powder was placed in a mashing kettle, and 3,800 L of warm water was then added thereto to produce a mash at about 40° C. In one part, the temperature was elevated to 100° C. to boil, and the remaining part was allowed to be saccharified. The mash of which saccharification was completed was raised to 78° C., and transferred to a wort filtration tank to filter, to give a filtrate (wort concentration: 12.5 w/w %).

One part of the filtrate obtained was taken, and hops were added thereto, and the mixture was boiled for 60 to 90 minutes. These adjusted worts were added with a bottom fermenting brewer's yeast which assimilates mainly glucose, sucrose, maltose, and isomaltose but does not or hardly assimilate the trisaccharide under the same conditions, and fermentation was carried out at about 10° C. for 10 to 30 days, to give a storage beer (lagered beer) of Examples having a bitterness unit and sugar contents as listed in Table 1. Here, the filtered beer was produced by filtering the storage beer, and the non-filtered yeast-containing beer was produced without filtration.

The flavor was evaluated by a sensory test according to scoring method by setting a temperature of the beer obtained to 7° C. Five well trained sensory panelists were asked to evaluate with a 5-point max score with respect to the presence or absence of "bitterness," "sweetness," and "the balance between bitterness and sweetness." An average score of the evaluation points was calculated by defining "strongly felt" as score 5," "felt" as score 4, "somewhat felt" as score 3, "slightly felt" as score 2, and "not felt" as score 1, and the evaluation was carried out under the following criteria in accordance with the average score. As comparative examples, the flavors of the commercially available beers were evaluated in accordance with a sensory test in the same manner. The results are shown in Table 1. Here, the beer temperature refers to a temperature measured at a central part of the liquid portion of the beer immediately after the froths settled when the glass was filled with the beer obtained to the upper brim of the glass (height: 11 cm, diameter: 6 cm, and 250 mL in volume), which was a value measured with a thermometer Testo 103 manufactured by Testo. In addition, the evaluation criteria of "○" or more are preferred, and the evaluation criteria of "◎" are more preferred.

<Criteria of Evaluation Scores>

X: an average score of 1.0 or more to less than 2.0;

Δ: an average score of 2.0 or more to less than 3.0;

○: an average score of 3.0 or more to less than 4.0; and

◎: an average score of 4.0 or more to 5.0 or less.

TABLE 1

| | Examples | | | | | | | |
|---|---|---|---|---|---|---|---|---|
| | 1 | 2 | 3 | 4 | 5 | 6 | 7 | 8 |
| Property Values | | | | | | | | |
| Alcohol Content (w/w %) | 3.48 | 3.48 | 3.45 | 3.42 | 3.70 | 3.73 | 3.67 | 3.67 |
| Bitterness Unit (BU) | 38.1 | 37.7 | 32.8 | 37.4 | 34.1 | 35.0 | 32.8 | 37.2 |
| Color (EBC) | 15.7 | 16.7 | 13.9 | 16.3 | 14.9 | 14.2 | 15.4 | 13.5 |
| Sugar Analysis | | | | | | | | |
| Glucose (w/v %) | 0.02 | 0.03 | 0.02 | 0.03 | 0.02 | 0.04 | 0.03 | 0.03 |
| Sucrose (w/v %) | 0.01 | 0.01 | — | 0.02 | 0.02 | 0.02 | 0.02 | 0.02 |
| Maltose (w/v %) | 0.37 | 0.38 | 0.25 | 0.44 | 0.08 | 0.11 | 0.12 | 0.12 |
| Isomaltose (w/v %) | 0.16 | 0.14 | 0.11 | — | 0.19 | 0.22 | 0.22 | 0.22 |
| Trisaccharide (w/v %) | 1.15 | 1.16 | 1.01 | 0.92 | 0.79 | 1.02 | 1.07 | 1.01 |
| Total Content (w/v %) of Sugar Composed of Glucose, Sucrose, Maltose, Isomaltose, and Trisaccharide | 1.71 | 1.72 | 1.39 | 1.41 | 1.10 | 1.41 | 1.46 | 1.40 |
| Total Content (w/v %) of Monosaccharide and Disaccharide | 0.56 | 0.56 | 0.38 | 0.49 | 0.31 | 0.39 | 0.39 | 0.39 |
| Weight Ratio of Trisaccharide Based on Total of Monosaccharide and Disaccharide (Trisaccharide/Monosaccharide and Disaccharide) | 2.05 | 2.07 | 2.66 | 1.88 | 2.55 | 2.62 | 2.74 | 2.59 |
| Presence or Absence of Yeast | Absent | Present | Absent | Absent | Absent | Present | Present | Present |
| Bitterness | ⊚ | ⊚ | ⊚ | ⊚ | ⊚ | ⊚ | ⊚ | ⊚ |
| Sweetness | ○ | ⊚ | ○ | ○ | ○ | ⊚ | ⊚ | ⊚ |
| Balance Between Bitterness and Sweetness | ⊚ | ⊚ | ⊚ | ⊚ | ⊚ | ⊚ | ⊚ | ⊚ |

| | Examples | | | | Comparative Examples | | |
|---|---|---|---|---|---|---|---|
| | 9 | 10 | 11 | 12 | 1 | 2 | 3 |
| Property Values | | | | | | | |
| Alcohol Content (w/w %) | 3.46 | 3.34 | 3.45 | 3.52 | 3.98 | 4.03 | 4.00 |
| Bitterness Unit (BU) | 38.2 | 36.9 | 40.3 | 38.2 | 28.9 | 20.6 | 19.8 |
| Color (EBC) | 18.3 | 16.3 | 15.6 | 15.1 | 10.2 | 8.1 | 7.6 |
| Sugar Analysis | | | | | | | |
| Glucose (w/v %) | 0.03 | 0.06 | 0.04 | 0.01 | 0.03 | 0.02 | 0.02 |
| Sucrose (w/v %) | 0.02 | — | — | 0.01 | 0.01 | 0.01 | — |
| Maltose (w/v %) | 0.25 | 0.70 | 0.39 | 0.26 | 0.10 | 0.08 | 0.08 |
| Isomaltose (w/v %) | 0.17 | 0.11 | 0.10 | 0.15 | 0.08 | 0.06 | 0.05 |
| Trisaccharide (w/v %) | 1.21 | 1.08 | 1.04 | 0.76 | 0.07 | 0.05 | 0.06 |
| Total Content (w/v %) of Sugar Composed of Glucose, Sucrose, Maltose, Isomaltose, and Trisaccharide | 1.68 | 1.95 | 1.57 | 1.19 | 0.29 | 0.22 | 0.21 |
| Total Content (w/v %) of Monosaccharide and Disaccharide | 0.47 | 0.87 | 0.53 | 0.43 | 0.22 | 0.17 | 0.15 |
| Weight Ratio of Trisaccharide Based on Total of Monosaccharide and Disaccharide (Trisaccharide/Monosaccharide and Disaccharide) | 2.57 | 1.24 | 1.96 | 1.77 | 0.32 | 0.29 | 0.40 |
| Presence or Absence of Yeast | Present | Present | Absent | Absent | Absent | Absent | Absent |
| Bitterness | ⊚ | ⊚ | ⊚ | ⊚ | ○ | Δ | Δ |
| Sweetness | ⊚ | ⊚ | ○ | ○ | Δ | ○ | Δ |
| Balance Between Bitterness and Sweetness | ⊚ | ⊚ | ⊚ | ⊚ | ○ | ○ | ○ |

As is clear from Table 1, Examples 1 to 12 were provided with bitterness and sweetness, and balances thereof were felt. In addition, Examples 2 and 6 to 10 contained yeast, which also were provided with bitterness and sweetness in the same manner, and balances thereof were felt.

perature range in Table 2 were indicated by the thermometer. Here, as the temperature range in the table, for example, in a case where the temperature is listed as "0 to 2 (° C.)," it shows a temperature range of 0° C. or higher and lower than 2° C.

TABLE 2

| Temp. Range (° C.) | Example 4 | | Comparative Example 1 | | Comparative Example 2 | | Comparative Example 3 | |
|---|---|---|---|---|---|---|---|---|
| | Measured Value (° C.) | Evaluation | Measured Value (° C.) | Evaluation | Measured Value (° C.) | Evaluation | Measured Value (° C.) | Evaluation |
| 0 to 2 | 1.0 | X | 1.5 | Δ | 0.5 | Δ | 1.0 | ○ |
| 2 to 4 | 3.0 | Δ | 2.5 | ○ | 3.5 | ○ | 3.0 | ○ |
| 4 to 6 | 5.0 | ○ | 5.5 | ○ | 4.5 | ○ | 5.0 | ○ |
| 6 to 8 | 7.0 | ⊚ | 7.0 | ○ | 7.0 | ○ | 7.0 | ○ |
| 8 to 10 | 9.0 | ○ | 9.5 | Δ | 8.5 | Δ | 9.0 | Δ |
| 10 to 12 | 11.0 | ○ | 10.5 | Δ | 11.5 | Δ | 11.0 | X |
| 12 to 14 | 13.0 | ○ | 13.5 | X | 12.5 | X | 13.0 | X |
| 14 to 16 | 15.0 | Δ | 14.5 | X | 15.5 | X | 15.0 | X |
| 16 to 18 | 17.0 | Δ | 17.5 | X | 16.5 | X | 17.0 | X |
| 18 to 20 | 19.0 | X | 18.5 | X | 19.5 | X | 19.0 | X |

In addition, it could be found from Table 1 that in beers of which bitterness unit was 30 BU or more, the fermented malt beverage having a content of specified sugars in particular ratios showed differences in the manner of feeling sweetness depending on the presence or absence of an yeast. For example, both of Examples 2 and 9 have the same level of a total sugar content as Example 1, but in the sensory evaluation of Examples 2 and 9, stronger sweetness was felt, perhaps due to the containment of an yeast. In addition, from the comparison of Examples 2 and 10 with Example 1, even if they had the same level of the trisaccharide concentration, in the sensory evaluation of Examples 2 and 10 stronger sweetness was felt than Example 1 perhaps due to the containment of an yeast. Also, Example 4 had the same level of the concentration of the trisaccharide, a total content of the sugars, a total content of the monosaccharides and the disaccharides, as in Examples 6 to 8, but in the sensory evaluation of Example 4, weaker sweetness was felt than Examples 6 to 8 perhaps due to the absence of an yeast.

On the other hand, as to Comparative Examples 1 to 3, although the balances between bitterness and sweetness were excellent, all of them had the tendencies that the strength of either one of the bitterness or sweetness was weak.

Test Example 2

Example 4 and Comparative Examples 1 to 3

The beer of Example 4 and the beers of Comparative Examples 1 to 3 prepared in Test Example 1 were evaluated for the presence or absence of "balance between bitterness and sweetness" as the flavor of the beers at temperatures listed in Table 2 by five well trained sensory panelists in the same manner as in Test Example 1. The beer temperatures in the table were values measured in the same manner as in Test Example 1, and a liquid temperature of the beer was gradually raised to room temperature, so that the liquid temperature was adjusted by allowing the beer to stand at room temperature of 25° C. while placing a thermometer inside the beer poured to a glass. The results are shown in Table 2. In addition, the indicated temperature was recorded at the timing where the numerical figures inside the tem- As is obvious from Table 2, it could be seen that Example 4 is excellent in the balances between bitterness and sweetness over a wide temperature range, and on the other hand, Comparative Examples 1 to 3 have narrower temperature ranges which are excellent in the balances between bitterness and sweetness.

As described above, since the fermented malt beverage of the present invention is provided with bitterness and sweetness, and excellent also in the balances thereof, and further keeps the balances over a wider temperature range. Therefore, even if the temperature of the beverage to be served cold upon drinking is raised and become lukewarm, the taste can be maintained, so that it is suggested that the time period of feeling the richness in taste is extended.

INDUSTRIAL APPLICABILITY

The fermented malt beverage of the present invention is provided with bitterness and sweetness, and excellent in the balances thereof, so that the beverage can provide a new taste as a luxury product.

The invention claimed is:

1. A fermented malt beverage obtained by fermenting a malt with a yeast, wherein the fermented malt beverage comprises (A) and (B):
    (A) a bitterness unit measured in accordance with a method described in the section 8.15 Bitterness Units of The Methods of Analysis of BCOJ is 30 to 45 BU; and
    (B) a total content of components consisting of glucose, sucrose, maltose, isomaltose, and a trisaccharide is 0.9 to 3.0 w/v %;
    wherein the content of the trisaccharide is from 0.65 to 1.50 w/v %, and
    wherein a ratio of the content of trisaccharide to a total content of glucose, sucrose, maltose and isomaltose is 1.24:1 to 3.5:1.

2. A fermented malt beverage obtained by fermenting a malt with a yeast, wherein the fermented malt beverage comprises (A) and (C):
    (A) a bitterness unit measured in accordance with a method described in the section 8.15 Bitterness Units of The Methods of Analysis of BCOJ is 30 to 45 BU; and (C) a content of a trisaccharide is 0.65 to 1.50 w/v %,
wherein a ratio of the content of trisaccharide to a total content of glucose, sucrose, maltose and isomaltose is 1.24:1 to 3.5:1.

3. The fermented malt beverage according to claim 1, wherein the trisaccharide comprises one or more members selected from the group consisting of maltotriose and isomaltotriose.

4. The fermented malt beverage according to claim 1, wherein the color is from 10 to 20 EBC.

5. The fermented malt beverage according to claim 1, wherein the alcohol content is 3.8 w/v % or less.

6. The fermented malt beverage according to claim 1, which comprises a yeast.

7. The fermented malt beverage according to claim 1, from which a yeast is removed.

8. The fermented malt beverage according to claim 2, wherein the trisaccharide comprises one or more members selected from the group consisting of maltotriose and isomaltotriose.

9. The fermented malt beverage according to claim 1, wherein the ratio of the content of trisaccharide to a total content of glucose, sucrose, maltose and isomaltose is 1.24:1 to 2.74:1.

10. The fermented malt beverage according to claim 2, wherein the ratio of the content of trisaccharide to a total content of glucose, sucrose, maltose and isomaltose is 1.24:1 to 2.74:1.

* * * * *